(12) United States Patent
Jannard et al.

(10) Patent No.: US 9,285,511 B2
(45) Date of Patent: Mar. 15, 2016

(54) VARIABLE POWER OPTICAL SYSTEM

(71) Applicant: BLACKEYE OPTICS, LLC, Eastsound, WA (US)

(72) Inventors: James H. Jannard, Las Vegas, NV (US); Iain A. Neil, Massagno (CH)

(73) Assignee: BLACKEYE OPTICS, LLC, Eastsound, WA (US)

( * ) Notice: Subject to any disclaimer, the term of this patent is extended or adjusted under 35 U.S.C. 154(b) by 84 days.

(21) Appl. No.: 14/165,172

(22) Filed: Jan. 27, 2014

(65) Prior Publication Data

US 2014/0285883 A1    Sep. 25, 2014

Related U.S. Application Data

(63) Continuation of application No. 12/753,639, filed on Apr. 2, 2010, now Pat. No. 8,638,496.

(60) Provisional application No. 61/168,523, filed on Apr. 10, 2009.

(51) Int. Cl.
*G02B 3/14* (2006.01)
*G02B 15/00* (2006.01)

(52) U.S. Cl.
CPC . *G02B 3/14* (2013.01); *G02B 15/00* (2013.01)

(58) Field of Classification Search
CPC .................................. G02B 3/14; G02B 15/00
USPC .................................. 359/362, 422, 666, 665
See application file for complete search history.

(56) References Cited

U.S. PATENT DOCUMENTS

| | | |
|---|---|---|
| 3,161,718 A | 12/1964 | De Luca |
| 3,366,437 A | 1/1968 | Moriyama et al. |
| 4,407,567 A | 10/1983 | Michelet et al. |

(Continued)

FOREIGN PATENT DOCUMENTS

| | | |
|---|---|---|
| CN | 1705901 A | 12/2005 |
| CN | 101208627 A | 6/2008 |

(Continued)

OTHER PUBLICATIONS

Applicant Summary of Interview with Examiner in U.S. Appl. No. 12/327,666 dated Sep. 27, 2010.

(Continued)

*Primary Examiner* — Frank Font
(74) *Attorney, Agent, or Firm* — Knobbe, Martens, Olson & Bear, LLP

(57) ABSTRACT

Liquid lens cells are used in a compound variable power optical system that forms an intermediate image between the object and the final image. A first variable power optical component is located between the object and an intermediate real image. The first variable power optical component varies power to change the magnification of the intermediate real image. A second variable power optical component is located between the intermediate real image and the final image. The second variable power optical component varies power to change the magnification of the final image. At least one of the first and second variable power optical components is stationary on the optical axis and comprises at least two liquids with different refractive properties and at least one variable shape contact surface between the two liquids, with variations in the shape of the contact surface producing a change of optical power in the optical system.

10 Claims, 9 Drawing Sheets

(56) References Cited

U.S. PATENT DOCUMENTS

| | | |
|---|---|---|
| 4,784,479 A | 11/1988 | Ikemori |
| 4,871,240 A | 10/1989 | Suda |
| 5,315,435 A | 5/1994 | Horiuchi |
| 6,070,016 A | 5/2000 | Kaneda |
| 6,166,864 A | 12/2000 | Horiuchi |
| 6,369,954 B1 | 4/2002 | Berge et al. |
| 6,449,081 B1 | 9/2002 | Onuki et al. |
| 6,459,535 B1 | 10/2002 | Goto |
| 6,538,823 B2 | 3/2003 | Kroupenkine et al. |
| 6,674,473 B1 | 1/2004 | Takada |
| 6,702,483 B2 | 3/2004 | Tsuboi et al. |
| 6,781,622 B1 | 8/2004 | Sato et al. |
| 6,906,867 B2 | 6/2005 | Nagata |
| 6,924,944 B2 | 8/2005 | Sekiyama |
| 6,934,090 B2 | 8/2005 | Nagaoka et al. |
| 6,936,809 B2 | 8/2005 | Viinikanoja |
| 6,950,245 B2 | 9/2005 | Nishioka et al. |
| 6,952,313 B2 | 10/2005 | Schrader |
| 6,961,188 B2 | 11/2005 | Betensky et al. |
| 6,965,480 B2 | 11/2005 | Kroupenkine |
| 6,987,529 B1 | 1/2006 | Ito |
| 6,992,700 B1 | 1/2006 | Sato et al. |
| 7,006,299 B2 | 2/2006 | Kroupenkine |
| 7,126,903 B2 | 10/2006 | Feenstra et al. |
| 7,142,368 B2 | 11/2006 | Kim et al. |
| 7,218,429 B2 | 5/2007 | Batchko |
| 7,224,534 B2 | 5/2007 | Ootsuka et al. |
| 7,227,682 B2 | 6/2007 | Caldwell et al. |
| 7,230,771 B2 | 6/2007 | Kuiper et al. |
| 7,253,966 B2 | 8/2007 | Saori |
| 7,265,911 B2 | 9/2007 | Goosey, Jr. et al. |
| 7,317,580 B2 | 1/2008 | Kogo et al. |
| 7,382,545 B2 | 6/2008 | Jung et al. |
| 7,403,344 B2 | 7/2008 | Xu et al. |
| 7,408,717 B2 | 8/2008 | Renders et al. |
| 7,413,306 B2 | 8/2008 | Campbell |
| 7,466,493 B2 | 12/2008 | Kim et al. |
| 7,855,838 B2 | 12/2010 | Jannard et al. |
| 8,027,096 B2 | 9/2011 | Feng et al. |
| 8,154,805 B2 * | 4/2012 | Jannard et al. ........... 359/666 |
| 8,169,709 B2 | 5/2012 | Jannard et al. |
| 8,638,496 B2 | 1/2014 | Jannard et al. |
| 8,687,281 B2 | 4/2014 | Jannard et al. |
| 8,773,766 B2 | 7/2014 | Jannard et al. |
| 8,879,161 B2 | 11/2014 | Jannard et al. |
| 2002/0176148 A1 | 11/2002 | Onuki et al. |
| 2004/0227063 A1 | 11/2004 | Viinikanoja |
| 2005/0113912 A1 | 5/2005 | Feenstra et al. |
| 2005/0200973 A1 | 9/2005 | Kogo et al. |
| 2005/0225877 A1 | 10/2005 | Tang |
| 2006/0028734 A1 * | 2/2006 | Kuiper et al. ........... 359/676 |
| 2006/0045504 A1 | 3/2006 | Zarnowski et al. |
| 2006/0047039 A1 | 3/2006 | Kato et al. |
| 2006/0067663 A1 | 3/2006 | Kita |
| 2006/0072019 A1 | 4/2006 | Stavely et al. |
| 2006/0106426 A1 | 5/2006 | Campbell |
| 2006/0126190 A1 | 6/2006 | Berge et al. |
| 2006/0227415 A1 | 10/2006 | Caldwell et al. |
| 2006/0256429 A1 | 11/2006 | Obrebski et al. |
| 2007/0041101 A1 | 2/2007 | Goosey, Jr. et al. |
| 2007/0153399 A1 | 7/2007 | Hendriks et al. |
| 2007/0247727 A1 | 10/2007 | Kim |
| 2007/0263293 A1 | 11/2007 | Batchko et al. |
| 2008/0088756 A1 * | 4/2008 | Tseng et al. ........... 349/33 |
| 2009/0091844 A1 | 4/2009 | Jannard et al. |
| 2009/0141352 A1 | 6/2009 | Jannard et al. |
| 2009/0141365 A1 | 6/2009 | Jannard et al. |
| 2009/0185281 A1 | 7/2009 | Hendriks |
| 2010/0259817 A1 | 10/2010 | Jannard et al. |
| 2010/0259833 A1 | 10/2010 | Jannard et al. |
| 2011/0058258 A1 | 3/2011 | Wang et al. |
| 2011/0085244 A1 | 4/2011 | Jannard et al. |
| 2011/0211262 A1 | 9/2011 | Craen et al. |
| 2012/0281295 A1 | 11/2012 | Jannard et al. |
| 2014/0211312 A1 | 7/2014 | Jannard et al. |
| 2014/0254025 A1 | 9/2014 | Jannard et al. |
| 2015/0055224 A1 | 2/2015 | Jannard et al. |

FOREIGN PATENT DOCUMENTS

| | | | |
|---|---|---|---|
| CN | 101268399 A | 9/2008 | |
| CN | 101821658 A | 9/2010 | |
| CN | 101836135 A | 9/2010 | |
| CN | 102388325 A | 3/2012 | |
| CN | 102388332 A | 3/2012 | |
| EP | 2071367 A1 | 6/2009 | |
| EP | 2208095 A1 | 7/2010 | |
| EP | 2217958 A1 | 8/2010 | |
| EP | 2217960 A2 | 8/2010 | |
| IN | 81/7/CHENP/2001 A | 3/2013 | |
| JP | 59-116712 | 7/1984 | |
| JP | 60-254014 | 12/1985 | |
| JP | 63-208817 | 8/1988 | |
| JP | 01-129221 | 5/1989 | |
| JP | 6-160779 | 6/1994 | |
| JP | 09-138345 | 5/1997 | |
| JP | 2001-249261 | 9/2001 | |
| JP | 2003-057410 | 2/2003 | |
| JP | 2004-312239 | 11/2004 | |
| JP | 2004-333640 | 11/2004 | |
| JP | 2004-356175 | 12/2004 | |
| JP | 2006-064947 | 3/2006 | |
| JP | 2007-094170 | 4/2007 | |
| JP | 2007-121821 | 5/2007 | |
| JP | 2008-170874 | 7/2008 | |
| KR | 10-2005-0059291 A | 6/2005 | |
| KR | 10-2005-0033308 A | 12/2005 | |
| KR | 10-2007-0103812 | 10/2007 | |
| TW | 2004-20910 A | 10/2004 | |
| TW | 2005-533953 A | 10/2005 | |
| TW | 2006-32364 A | 9/2006 | |
| TW | 2007-30911 A | 8/2007 | |
| TW | 2007-36851 A | 10/2007 | |
| WO | WO 01/55766 | 8/2001 | |
| WO | WO 2004/038480 A1 | 5/2004 | |
| WO | WO 2004083899 A2 * | 9/2004 | |
| WO | WO 2005/069042 A1 | 7/2005 | |
| WO | WO 2005073778 A1 * | 8/2005 | ............ G02B 26/02 |
| WO | WO 2006/103290 A1 | 10/2006 | |
| WO | WO 2006/110283 A2 | 10/2006 | |
| WO | WO 2008/010124 A1 | 1/2008 | |
| WO | WO 2009/048725 A1 | 4/2009 | |
| WO | WO 2009/073387 A1 | 6/2009 | |
| WO | WO 2009/073388 A2 | 6/2009 | |
| WO | WO 2010/117628 A2 | 10/2010 | |
| WO | WO 2010/117731 A2 | 10/2010 | |

OTHER PUBLICATIONS

Exam Report in Australian Application No. 2008311114 dated Jan. 31, 2013.
Examiner Interview Summary in U.S. Appl. No. 12/327,651 dated Jun. 23, 2011.
Examiner Interview Summary in U.S. Appl. No. 12/327,651 dated Aug. 30, 2010.
Examiner Interview Summary in U.S. Appl. No. 12/327,651 dated Jan. 25, 2012.
Examiner Interview Summary in U.S. Appl. No. 12/327,666 dated May 20, 2013.
Examiner Interview Summary in U.S. Appl. No. 12/327,666 dated Aug. 27, 2010.
Examiner Interview Summary in U.S. Appl. No. 12/327,666 dated Jan. 25, 2012.
Examiner Interview Summary in U.S. Appl. No. 12/327,666 dated Jun. 20, 2012.
Final Office Action in U.S. Appl. No. 12/327,651 mailed Sep. 7, 2011.
First Office Action in Australian Application No. 2008331642 dated Mar. 22, 2013.
First Office Action in Australian Application No. 2008331643 dated Feb. 19, 2013.

(56) References Cited

OTHER PUBLICATIONS

International Preliminary Report on Patentability and Written Opinion in PCT Application No. PCT/US2008/077086 mailed Apr. 22, 2010.
International Preliminary Report on Patentability and Written Opinion in PCT Application No. PCT/US2008/084232 dated Jun. 17, 2010.
International Preliminary Report on Patentability and Written Opinion in PCT Application No. PCT/US2008/084233 (International Publication No. WO 2009/073388 A2) dated Jun. 17, 2010.
International Preliminary Report on Patentability in PCT Application No. PCT/US2010/028421 mailed Oct. 20, 2011.
International Preliminary Report on Patentability in PCT Application No. PCT/US2010/029069 mailed Oct. 20, 2011.
International Search Report and Written Opinion in PCT Application No. PCT/US2010/029069 (International Publication No. WO 2010/117731 A2) dated Oct. 26, 2010.
International Search Report in PCT Application No. PCT/US2008/077086 mailed Feb. 2, 2009 in 7 pages.
International Search Report in PCT Application No. PCT/US2008/084232 mailed Feb. 23, 2009 in 7 pages.
International Search Report in PCT Application No. PCT/US2008/084233 mailed Jul. 3, 2009 in 10 pages.
International Search Report in PCT Application No. PCT/US2010/028421 mailed Dec. 17, 2010 in 9 pages.
"Liquid Lens Mass Production", Consumer Electronics Industry, Aug. 30, 2006.
"Liquid Lenses for Camera Phones", Roland Piquepaille's Technology Trends, http://www.primidi.com/2004/12/02.html, Dec. 2, 2004.
"Liquid zoom lenses to be available in camera phones before the end of 2005", Cameras and Imaging, http://www.gizmag.com/go/3922/.
Lyon, "Varioptic to Enforce Liquid Lens Patent Rights", Varioptic Newsletter—Mar. 2004, Mar. 17, 2004.
Neil, "Compound zoom lenses", Panavision International, L.P., 2005.
Notice of Allowance in U.S. Appl. No. 12/246,224 issued Aug. 11, 2010.
Notice of Allowance in U.S. Appl. No. 12/753,536 dated Dec. 6, 2011.
Notice of Allowance in U.S. Appl. No. 12/969,488 dated Dec. 28, 2011.
Office Action in U.S. Appl. No. 12/327,666 dated Feb. 16, 2012.
Office Action in Australian Application No. 20100234963 dated May 24, 2013.
Office Action in Chinese Application No. 200880110582.1 dated Feb. 26, 2013.
Office Action in Chinese Application No. 200880110582.1 dated Jun. 23, 2011.
Office Action in Chinese Application No. 200880111594.6 dated Jan. 31, 2011.
Office Action in Chinese Application No. 200880111594.6 dated May 13, 2013.
Office Action in Chinese Application No. 200880111594.6 mailed Aug. 27, 2012.
Office Action in Chinese Application No. 200880118070 dated Jan. 18, 2012.
Office Action in Chinese Application No. 201080016154.X dated Jun. 6, 2013.
Office Action in European Application No. 08837977.1 dated Sep. 5, 2012.
Office Action in European Application No. 10762108.8 dated Apr. 10, 2013.
Office Action in Japanese Application No. 2010-528925 mailed Feb. 19, 2013.
Office Action in Japanese Application No. 2010-536971 dated May 14, 2013.
Office Action in Japanese Application No. 2010-536972 dated May 21, 2013.
Office Action in U.S. Appl. No. 12/246,224 issued Dec. 30, 2009.
Office Action in U.S. Appl. No. 12/327,666 dated Jan. 16, 2013.
Office Action in U.S. Appl. No. 12/327,651 dated Jan. 29, 2010.
Office Action in U.S. Appl. No. 12/327,651 dated Jun. 30, 2010.
Office Action in U.S. Appl. No. 12/327,651 dated Mar. 23, 2011.
Office Action in U.S. Appl. No. 12/327,666 dated Sep. 15, 2011.
Office Action in U.S. Appl. No. 12/753,536 dated Apr. 28, 2011.
"Optical solution", The Economist Newspaper and the Economist Group, http://www.economist.com/PrinterFriendly.cfm?story id=9571244, Jul. 31, 2007.
Opto & Laser Europe, "Liquid lenses eye commercial breakthrough", http://optics.org/articles/ole/8/11/2/1, Nov. 2003.
Partial International Search Report in PCT Application No. PCT/US2008/084233 mailed Apr. 14, 2009 in 7 pages.
Request for Continued Examination, Amendment, and Applicant Summary of Interview with Examiner in U.S. Appl. No. 12/327,651 dated Nov. 1, 2010.
Response and Amendment in U.S. Appl. No. 12/246,224 dated Apr. 30, 2010.
Response and Amendment in U.S. Appl. No. 12/327,651, electronically filed Apr. 29, 2010 in response to Office Action dated Jan. 29, 2010.
Response to Restrictions Requirements in U.S. Appl. No. 12/753,536 dated Mar. 4, 2011.
Restrictions Requirements in U.S. Appl. No. 12/327,666 dated Jul. 5, 2011.
Restrictions Requirements in U.S. Appl. No. 12/753,536 dated Feb. 2, 2011.
Second Office Action in Chinese Application No. 200880118070.X dated Jan. 10, 2013.
Second Office Action in Chinese Application No. 200880111594.6 dated Jan. 20, 2012.
Supplementary European Search Report in European Application No. 10762108.8 mailed Aug. 17, 2012.
Supplementary European Search Report in European Application No. 10762153.4 mailed Aug. 17, 2012.
Written Opinion in PCT Application No. PCT/US2008/077086 mailed Feb. 2, 2009 in 7 pages.
Written Opinion in PCT Application No. PCT/US2008/084232 mailed Feb. 23, 2009 in 6 pages.
Written Opinion in PCT Application No. PCT/US2008/084233 mailed Jul. 3, 2009 in 9 pages.
Zubgy, "Liquid Lenses: Small variable-focus fluid lens elements", Dec. 8, 2006.
Geary, J.: Introduction to Lens Design: With Practical ZEMAX Examples, Center for Applied Optics, Richmond, VA pp. 23, 2002.

\* cited by examiner

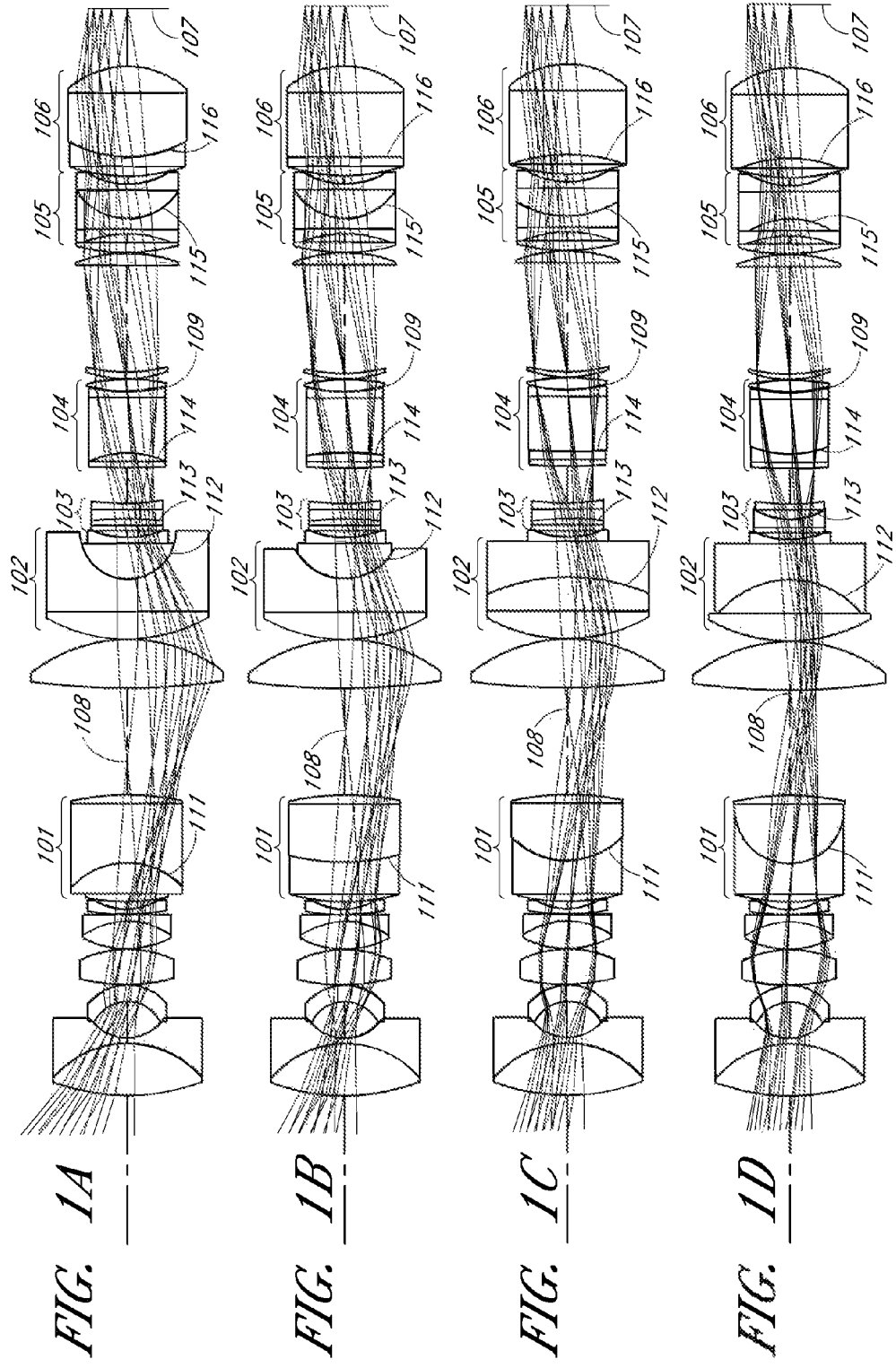

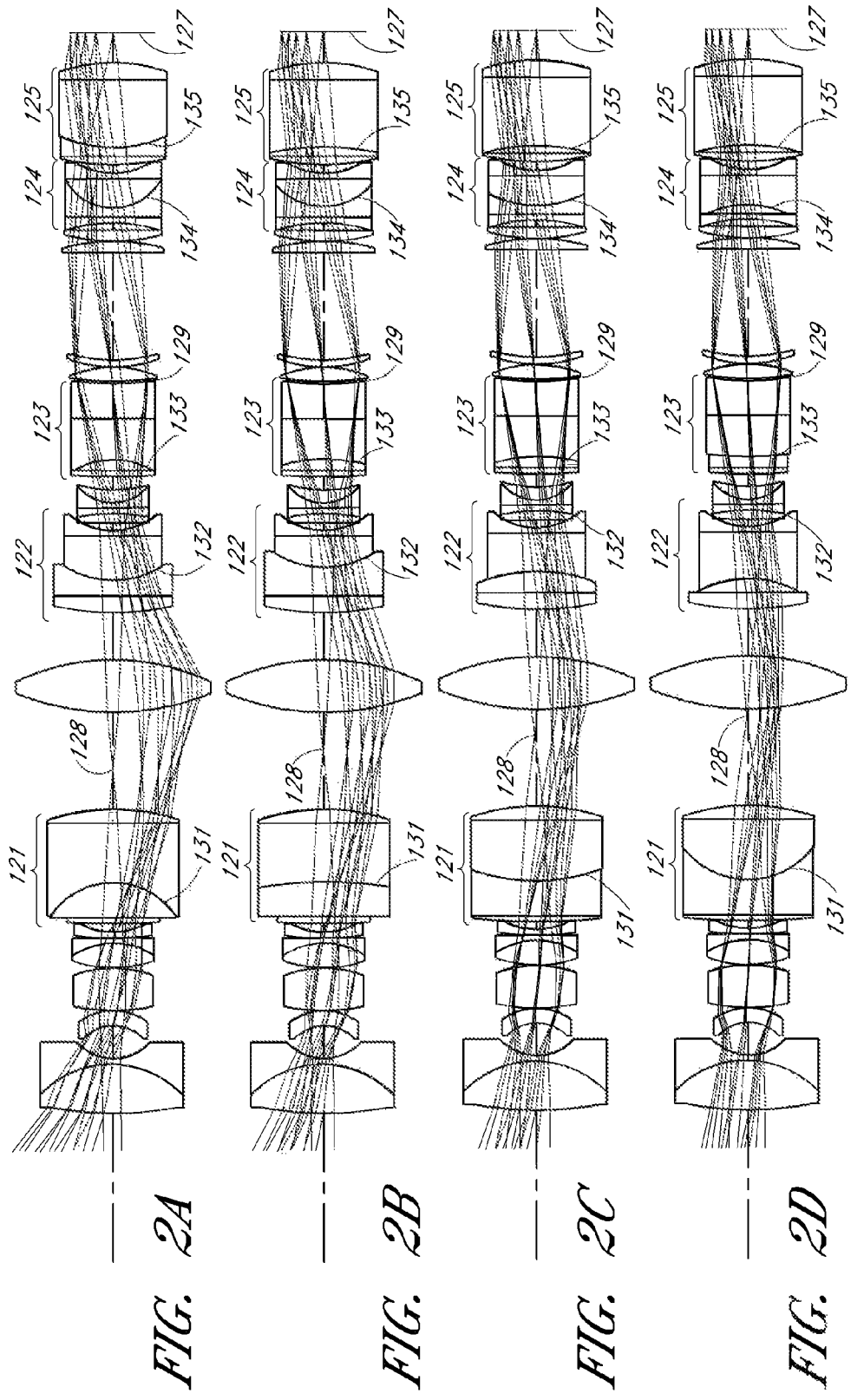

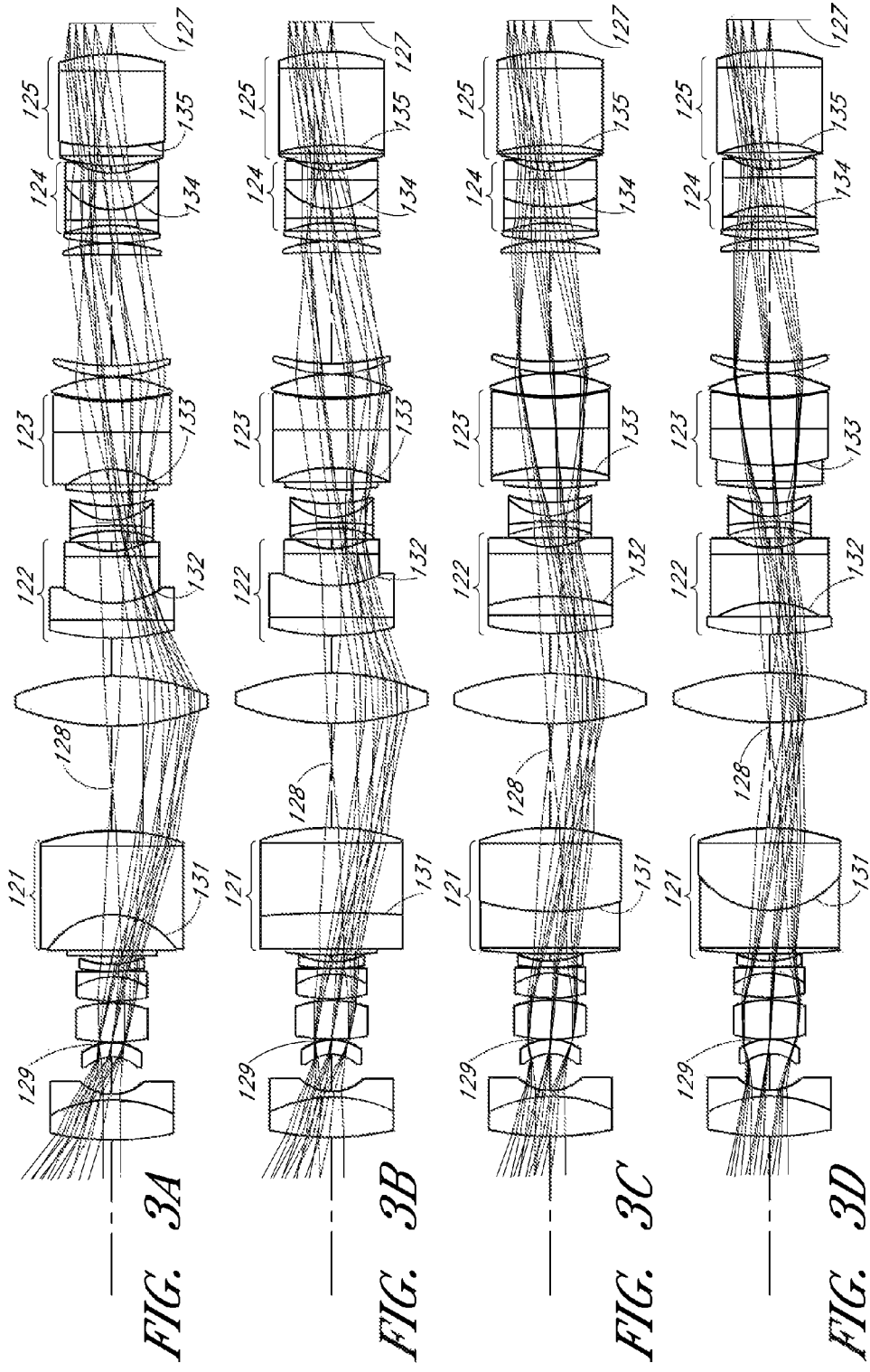

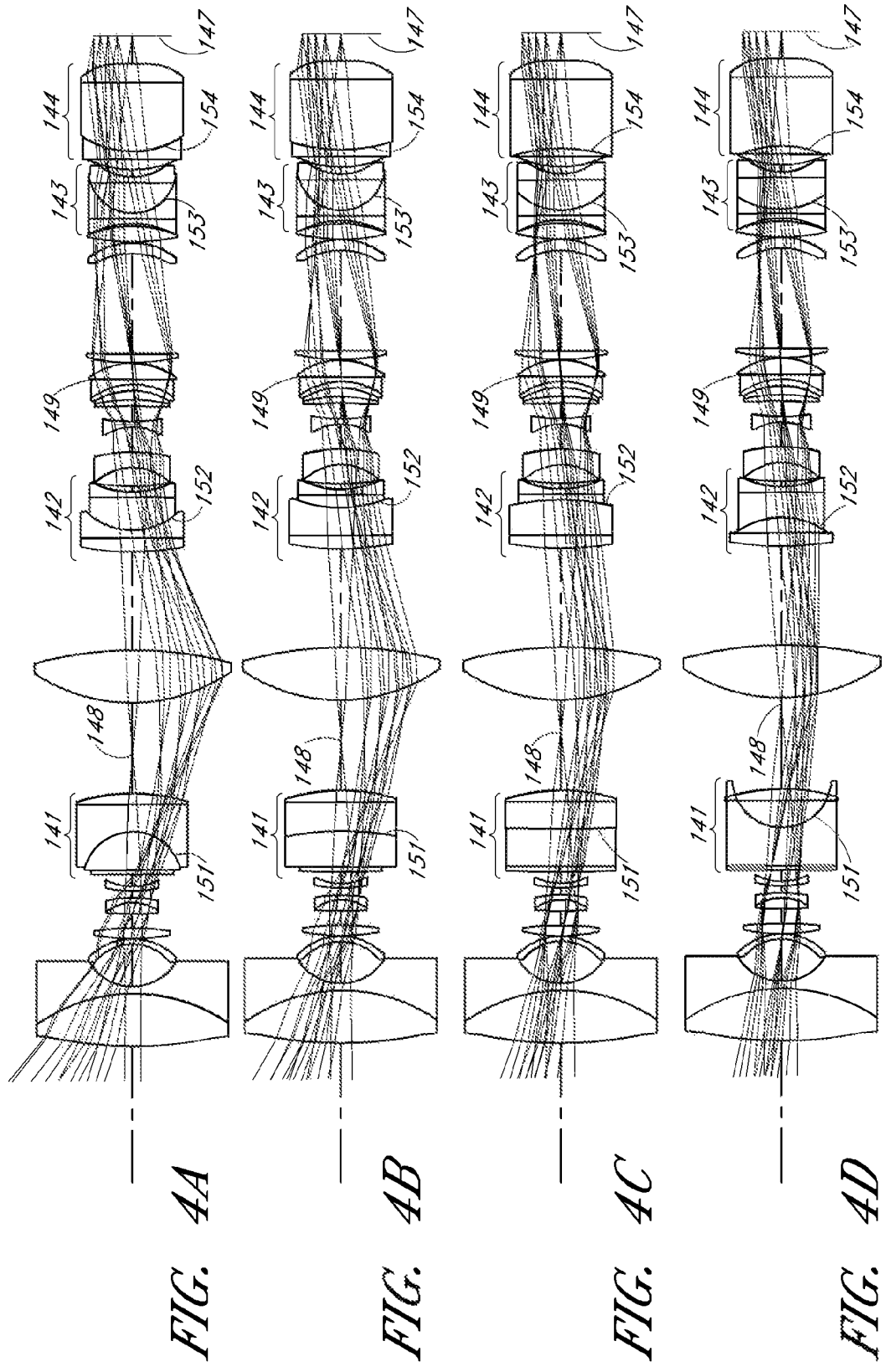

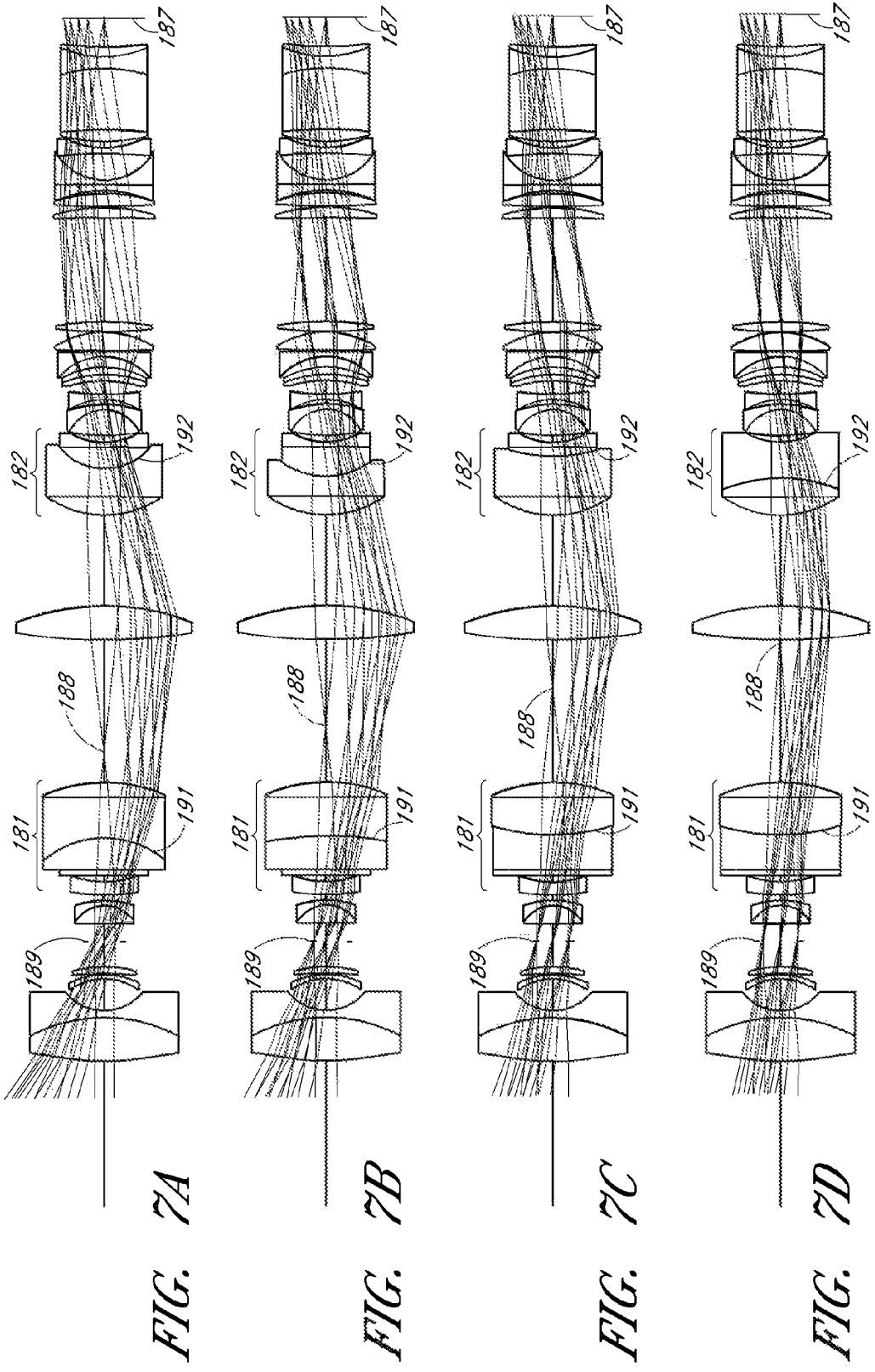

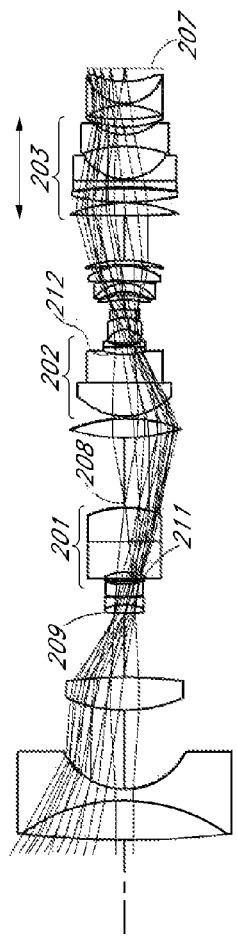
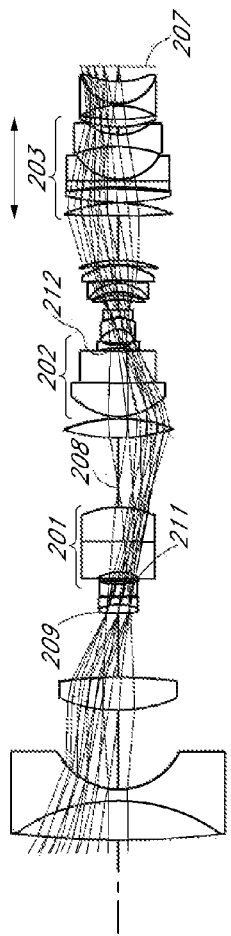
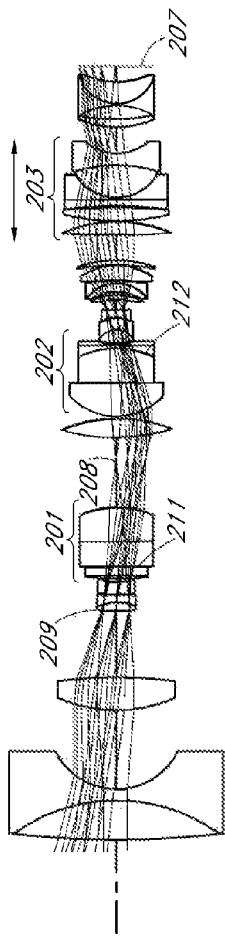
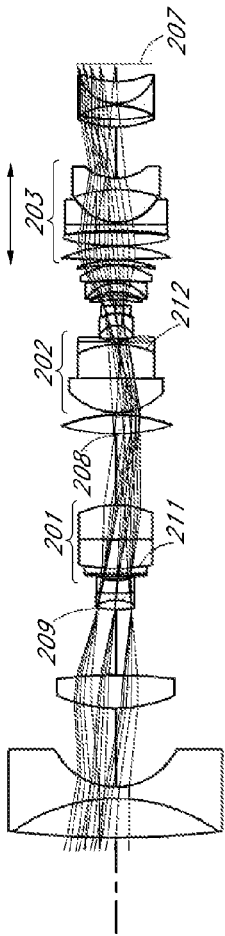
FIG. 8A
FIG. 8B
FIG. 8C
FIG. 8D

VARIABLE POWER OPTICAL SYSTEM

RELATED APPLICATIONS

This application is a continuation of U.S. patent application Ser. No. 12/753,639, filed Apr. 2, 2010, entitled "VARIABLE POWER OPTICAL SYSTEM," which is set to issue as U.S. Pat. No. 8,638,496 on Jan. 28, 2014, which claims the benefit of priority of U.S. Provisional 61/168,523 filed Apr. 10, 2009. Each of the applications referenced in this paragraph is hereby incorporated by reference in its entirety so as to make part of this specification.

BACKGROUND

The present invention relates to variable power optical systems.

Some zoom lens designs group the lens used in the design, with one group being used largely for zooming, a second group being used largely for keeping an image in focus, and a third group used to keep the image plane stationary. A fourth group may also be used to form a sharp image. The focusing group may be adjusted for focusing the zoom lens at any focal length position without the need to refocus for other focal lengths of the zoom lens. The zooming group (or "variator") causes significant magnification change during zooming. The lens group that stabilizes the image plane may also be used to provide magnification.

Desirable features in a zoom lens include high zoom ratio and a wide angle field of view. As the zoom range of a lens system increases, generally the length and weight also increases. Consumer products such as cellular telephones or point-and-shoot cameras are often small and lightweight, so zoom lenses included in those products are constrained by size and weight. Moreover, as the focal length range of a lens system increases, generally focusing problems also increase usually at the wide field of view zoom positions.

SUMMARY

Liquid lens cells comprise two or more fluids in a chamber. The fluids contact to form a surface that is variable by, for example, through electrical nodes. A fluid may be, for example, one or more gases, one or more liquids, or a mixture of one or more solids and one or more liquids. Using liquid lens cells to replace one or more moving lens groups results in additional configuration options for the optical path. Liquid cells can be used in a compound zoom lens system to take advantage of these properties. Many point and shoot cameras and cell phone cameras do not have large amounts of space for a long lens. Using liquid cells in combination with folds or redirection of the radiation axis allows for better zoom lens systems in these small camera packages. Larger cameras can also benefit.

BRIEF DESCRIPTION OF THE DRAWINGS

FIGS. 1A-1D are optical diagrams of a compound zoom lens system employing six liquid lens cells, with a surface of the liquids being varied to provide a range of zoom positions.

FIGS. 2A-2D are optical diagrams of a compound zoom lens system employing five liquid lens cells, with a surface of the liquids being varied to provide a range of zoom positions.

FIGS. 3A-3D are optical diagrams of a compound zoom lens system employing five liquid lens cells, with a surface of the liquids being varied to provide a range of zoom positions.

FIGS. 4A-4D are optical diagrams of a compound zoom lens system employing four liquid lens cells, with a surface of the liquids being varied to provide a range of zoom positions.

FIGS. 7A-7D are optical diagrams of a compound zoom lens system employing two liquid lens cells, with a surface of the liquids being varied to provide a range of zoom positions.

FIGS. 8A-8D are optical diagrams of a compound zoom lens system employing a moving lens group and two liquid lens cells, with a surface of the liquids being varied to provide a range of zoom positions.

DETAILED DESCRIPTION

Figure 5A:
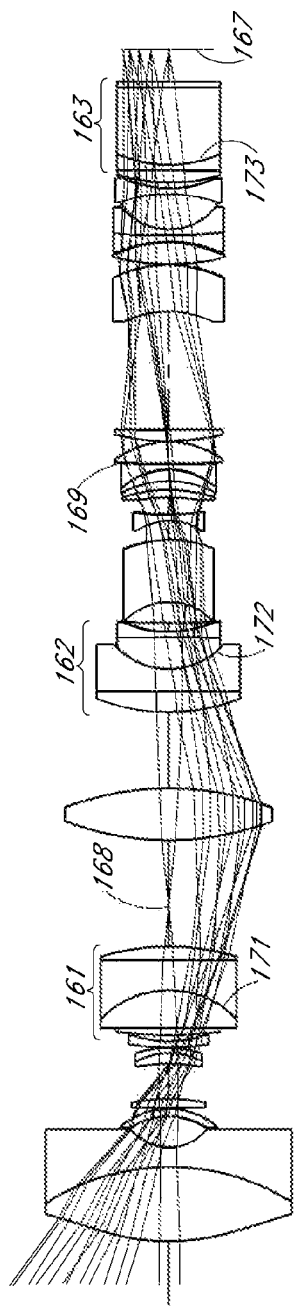
FIGS. 5A-5D are optical diagrams of a compound zoom lens system employing three liquid lens cells, with a surface of the liquids being varied to provide a range of zoom positions.
Figure 5B:
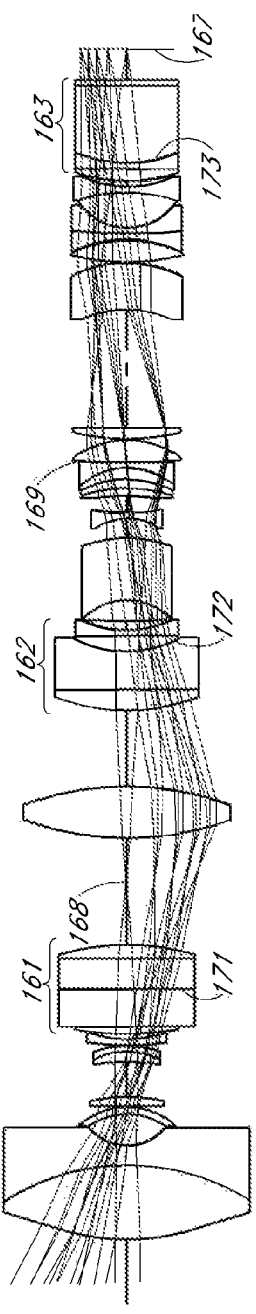
Figure 5C:
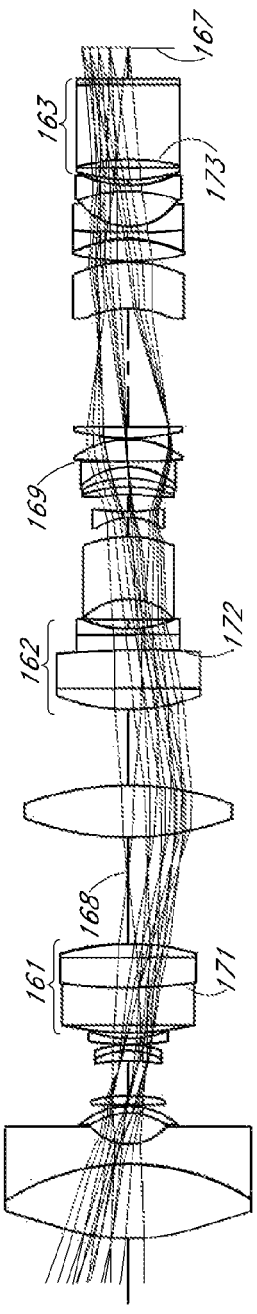
Figure 5D:
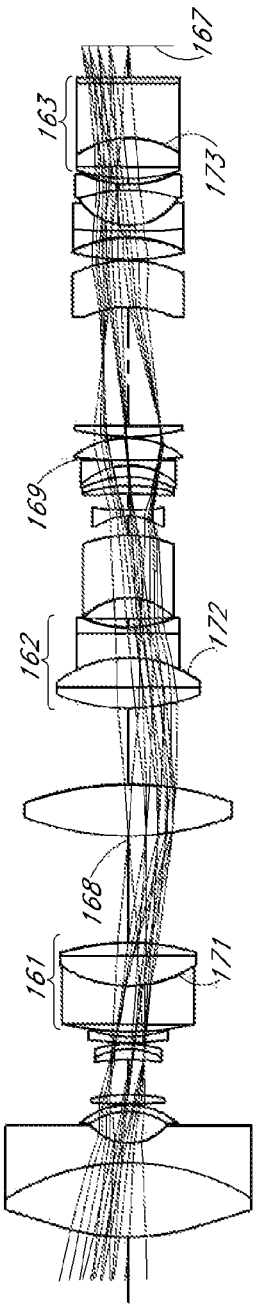
Figure 6A:
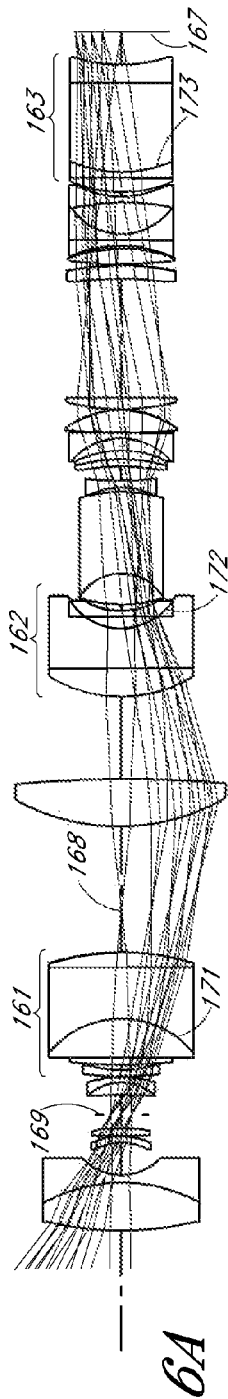
FIGS. 6A-6D are optical diagrams of a compound zoom lens system employing three liquid lens cells, with a surface of the liquids being varied to provide a range of zoom positions.
Figure 6B:
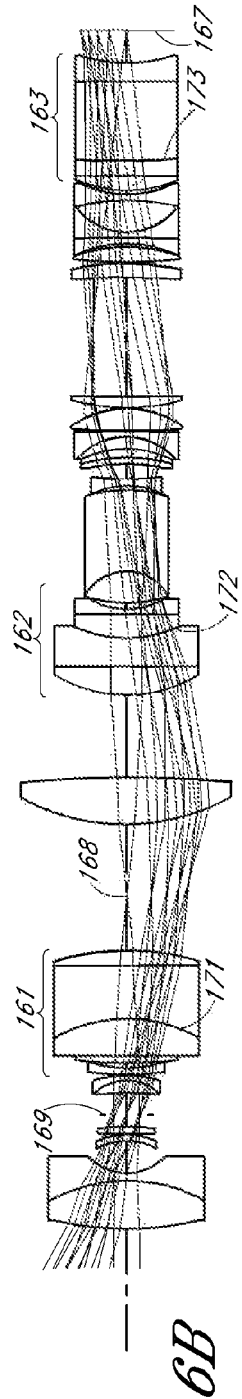
Figure 6C:
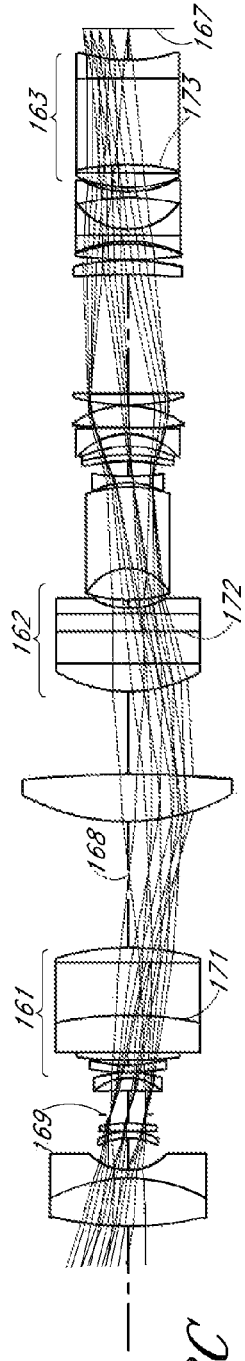
Figure 6D:
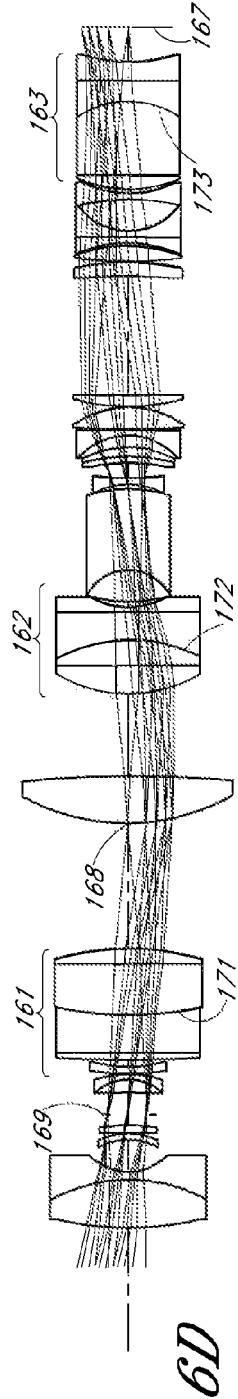

In the following description, reference is made to the accompanying drawings. It is to be understood that other structures and/or embodiments may be utilized without departing from the scope of the invention.

Liquid lens cells can modify an optical path without relying upon mechanical movement of the liquid cell. A liquid lens cell comprising first and second contacting liquids may be configured so that a contacting optical surface between the contacting liquids has a variable shape that may be substantially symmetrical relative to an optical axis of the liquid lens cell. A plurality of lens elements could be aligned along a common optical axis and arranged to collect radiation emanating from an object side space and delivered to an image side space. The liquid lens cell could be inserted into an optical path formed by the plurality of lens elements that are aligned along the common optical axis. The optical axis of the liquid lens cell could be parallel to the common optical axis, or it could be at an angle or decentered to the common optical axis.

Presently contemplated liquid lens systems will have a difference in refractive index of about 0.2 or more, preferably at least about 0.3, and in some embodiments at least about 0.4. Water has a refractive index of about 1.3, and adding salt may allow varying the refractive index to about 1.48. Suitable optical oils may have a refractive index of at least about 1.5. Even by utilizing liquids with higher, lower or higher and lower refractive indices, for example a higher refractive index oil, the range of power variation remains limited. This limited range of power variation usually provides less magnification change than that of a movable lens group. Therefore, in a simple variable power optical system, to provide zooming while maintaining a constant image surface position most of the magnification change may be provided by one movable lens group and most of the compensation of defocus at the image surface during the magnification change may be provided by one liquid cell.

It should be noted that more movable lens groups or more liquid cells, or both, may be utilized. Examples of one or more moving lens groups used in combination with one or more liquid cells is described in U.S. patent application Ser. No. 12/246,224 titled "Liquid Optics Zoom Lens and Imaging Apparatus," filed Oct. 6, 2008, and incorporated by reference in its entirety.

The size and properties of lens elements used in a system introduce constraints to be considered in designing the lens system. For example, the diameter of one or more lens elements may limit the size of an image formed on an image surface. For lens systems with variable properties, such as a variable power optical system, the optics may change based on variation of the lens elements. Thus, a first lens element may constrain a lens system in a first zoom configuration, while a second lens element constrains the lens system in a second zoom configuration. As an example, the rim rays for a light beam may approach the outer edge of a lens element at one extreme of the zoom range, while being a significant distance from the outer edge of the same lens element at the other extreme of the zoom range.

FIGS. 1A-1D illustrate optical diagrams of a simplified compound variable power optical system that forms an intermediate image 108 and a final image 107. As illustrated the stop 109 is located just after liquid lens cell 104 in the relay portion of the lens. The variable power optical system may be used, for example, with a camera. FIG. 1A illustrates the zoom ratio in the wide position, and FIG. 1D illustrates the zoom ratio in the telephoto position.

The variable power optical system illustrated in FIGS. 1A-1D has no moving lens groups. Instead, the zooming and a constant focus at the final image is accomplished through six liquid lens cells 101, 102, 103, 104, 105 and 106, with each liquid lens cell having a variable surface 111, 112, 113, 114, 115 and 116. A control system may be used to control the variable shape of the contacting optical surface in liquid lens cells 101, 102, 103, 104, 105 and 106.

It is to be understood that liquid lens cells could each comprise multiple surfaces, with the surfaces being controllable and/or fixed. In some embodiments, the liquid lens cells could comprise a combination of two or more liquid cells. A plate may be placed between the combined cells. The plate may have an optical power that may be set as desired for the design. The liquid lens cells may also have plates on the exterior surfaces. In some embodiments, the plates on the exterior surfaces may provide optical power or a folding function. The plates and other lens elements can be spherical or aspherical to provide improved optical characteristics.

The individual lens elements may be constructed from solid-phase materials, such as glass, plastic, crystalline, or semiconductor materials, or they may be constructed using liquid or gaseous materials such as water or oil. The space between lens elements could contain one or more gases. For example normal air, nitrogen or helium could be used. Alternatively the space between the lens elements could be a vacuum. When "Air" is used in this disclosure, it is to be understood that it is used in a broad sense and may include one or more gases, or a vacuum. The lens elements may have coatings such as an ultraviolet ray filter.

Liquids in a liquid lens cell may have a fixed volume, and the shape of the outer surface of the liquid lens cell may be fixed. In the accompanying figures, some of the liquid lens cells are illustrated in a way that suggest variation in the volume of liquids and/or variation in the shape of the outer surface of the liquid lens cell. This also means the vertex points of the surfaces shift axially. The illustrations were generated with computer software without placing constraints on volume or shape of the liquid lens cells. The accompanying figures illustrate the concepts of using liquid lens cells in a variable power optical system, and appropriate modifications may be made for the various liquid lens cells that may be used.

The lens elements illustrated in FIGS. 1A-1D are arranged to form an intermediate image 108. Although the location and size of the intermediate image 108 changes as the zoom position changes, it remains between liquid lens cells 101 and 102. Although FIGS. 1A-1D illustrate an objective optics group followed by a relay optics group, multiple relay optics groups could also be used to achieve higher magnifications. Additional magnification can be achieved with high refractive index fluids.

Using liquid lens cells to replace one or more moving lens groups results in additional configuration options for the optical path. Replacing moving lens groups with liquid lens cells facilitates additional design possibilities. For example, a linear optical design may result in a lens that is longer than desired. The use of liquid lens cells instead of a moving group facilitates the use of optical elements such as folds to redirect the radiation axis and reduce the physical length of a lens. Although the overall length of the optical path through the lens may remain the same, the liquid lens cells may provide strategic space for folding that reduces the length in one or more directions. This allows longer overall lens lengths to be used in smaller camera packages. For example, many point and shoot cameras and cell phone cameras do not have large amounts of space for a long lens. Using liquid cells in combination with folds allows for better lens systems in these small camera packages. Larger cameras can also benefit from reducing the camera package length that would be required for a lens system that did not use folds. Using liquid lens cells may also allow for a smaller diameter, especially towards the front of the lens design and especially for wide field of view positions. Folding in combination with a relatively small front diameter, as compared to conventional moving group zoom lens designs, may provide for more compact and ergonomically shaped camera packages.

FIGS. 2A-2D illustrate optical diagrams of a simplified compound variable power optical system using five liquid cells 121, 122, 123, 124, and 125, with each liquid lens cell having a variable surface 131, 132, 133, 134, and 135. The stop 129 is located just after liquid cell 123 in the relay optics group. The optical system forms an intermediate image 128 and a final image 127.

FIGS. 3A-3D illustrate optical diagrams of a simplified compound variable power optical system using five liquid cells 121, 122, 123, 124, and 125, with each liquid lens cell having a variable surface 131, 132, 133, 134, and 135. This design is similar to the design illustrated in FIGS. 2A-2D, but the stop 129 is located in the objective optics group. This may improve the image quality and may allow for liquid cells with smaller diameters, but may also reduce the relative illumination.

FIGS. 4A-4D illustrate optical diagrams of a simplified compound variable power optical system using four liquid cells 141, 142, 143, and 144, with each liquid lens cell having a variable surface 151, 152, 153, and 154. The stop 149 is located in the relay lens group. The optical system forms an intermediate image 148 and a final image 147.

FIGS. 5A-5D illustrate optical diagrams of a simplified compound variable power optical system using three liquid cells 161, 162, and 163, with each liquid lens cell having a variable surface 171, 172, and 173. The stop 169 is located in the relay lens group. The optical system forms an intermediate image 168 and a final image 167.

FIGS. 6A-6D illustrate optical diagrams of a simplified compound variable power optical system using three liquid cells 161, 162, and 163, with each liquid lens cell having a variable surface 171, 172, and 173. The stop 169 is located in the objective lens group. The optical system forms an intermediate image 168 and a final image 167.

FIGS. 7A-7D illustrate optical diagrams of a simplified compound variable power optical system using two liquid cells 181 and 182, with each liquid lens cell having a variable surface 191 and 192. The stop 189 is located in the objective lens group. The optical system forms an intermediate image 188 and a final image 187.

FIGS. 8A-8D illustrate optical diagrams of a simplified compound variable power optical system using two liquid cells 201 and 202, with each liquid lens cell having a variable surface 211 and 212. The illustrated embodiment also has a moving lens group 203. An intermediate image is formed at image surface 208, between the liquid cells 201 and 202. The configuration of optical elements results in a final image 207 that is larger than the final images obtained in earlier embodiments. This allows the use of a larger image sensor, such as sensors 11 mm to 28 mm and above. A moving lens group is used near the sensor because the diameter of a liquid cell may not be sufficiently large to achieve the desired performance. Of note, the final image 207 is also larger than the rim rays at the liquid lens cell variable surface 211 and 212.

For each of the lens designs shown in FIGS. 1-8, a listing produced by the CodeV optical design software version 9.70 commercially available from Optical Research Associates, Pasadena, Calif. USA is attached hereto as part of this specification and incorporated by reference in its entirety.

The lens designs shown in FIGS. 1-8 provide a relatively high zoom ratio, as can be seen from the range of focal lengths of the lens designs listed in TABLE 1. For example, the lens designs in FIGS. 1-8 respectively provide zoom ratios of about 4.4× (F4/F1=−15.6497/−3.5462), 3.3× (−23.9964/−7.2007), 3.3× (−23.9985/−7.2005), 3.3× (−23.9965/−7.2), 3× (−22.046/−7.351), 3× (−22.0489/−7.3514), 2.8× (−21.9962/−7.8524), and 2.8× (−55.7271/−20.0878).

TABLE 1

Effective Focal Length for Lens Designs

| Lens Design Figure | Position 1 | Position 2 | Position 3 | Position 4 |
| --- | --- | --- | --- | --- |
| FIG. 1 | −3.5462 | −5.4545 | −8.9999 | −15.6497 |
| FIG. 2 | −7.2007 | −10.3000 | −15.4998 | −23.9964 |
| FIG. 3 | −7.2005 | −10.2999 | −15.4999 | −23.9985 |
| FIG. 4 | −7.2000 | −10.2999 | −15.4990 | −23.9965 |
| FIG. 5 | −7.3510 | −10.2999 | −15.4979 | −22.0460 |
| FIG. 6 | −7.3514 | −10.3000 | −15.5003 | −22.0489 |
| FIG. 7 | −7.8524 | −10.3484 | −15.8485 | −21.9962 |
| FIG. 8 | −20.0878 | −25.9451 | −40.0379 | −55.7271 |

Figure 9:
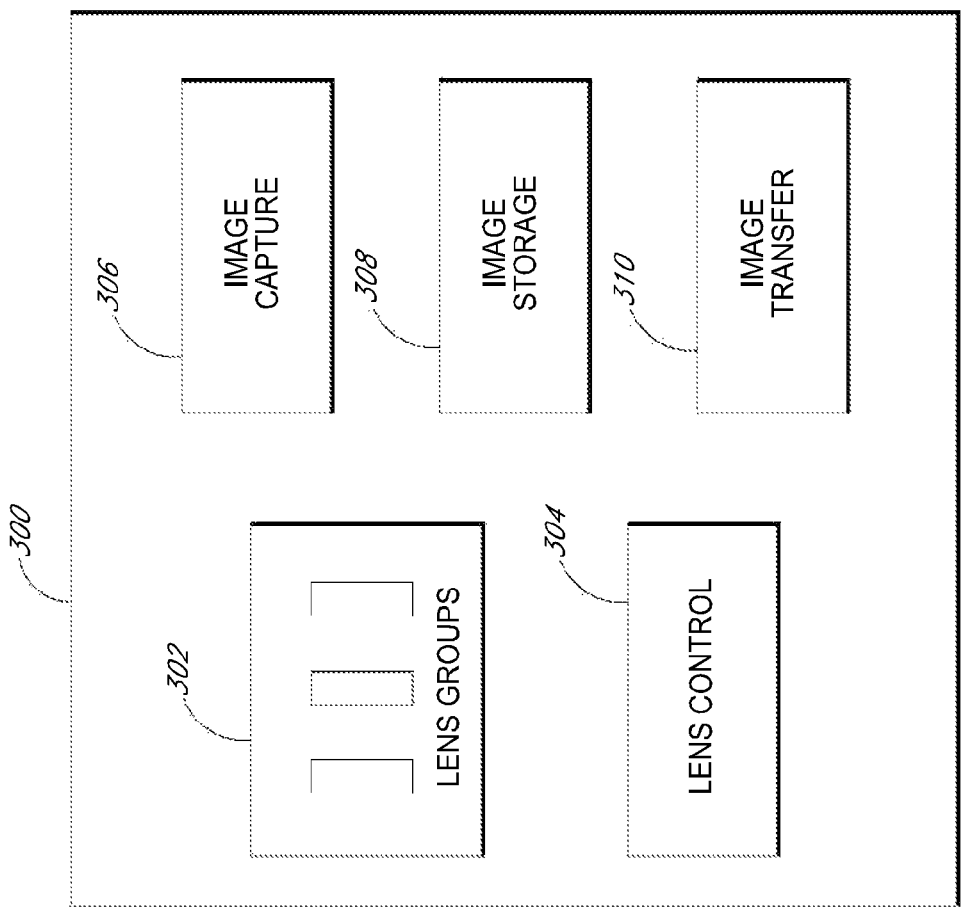
FIG. 9 illustrates a block diagram of a camera with a zoom lens.

FIG. 9 illustrates a block diagram of a camera 100 with a zoom lens 102. FIG. 9 also illustrates a lens control module 104 that controls the movement and operation of the lens groups in lens 102. The control module 104 includes electronic circuitry that controls the radius of curvature in the liquid lens cell. The appropriate electronic signal levels for various focus positions and zoom positions can be determined in advance and placed in one or more lookup tables. Alternatively, analog circuitry or a combination of circuitry and one or more lookup tables can generate the appropriate signal levels. In one embodiment, one or more polynomials are used to determine the appropriate electronic signal levels. Points along the polynomial could be stored in a lookup table or the polynomial could be implemented with circuitry. The lookup tables, polynomials, and/or other circuitry may use variables for zoom position, focus position, temperature, or other conditions.

Thermal effects may also be considered in the control of the radius of curvature of surface between the liquids. The polynomial or lookup table may include an additional variable related to the thermal effects.

The control module 104 may include preset controls for specific zoom settings or focal lengths. These settings may be stored by the user or camera manufacturer.

FIG. 9 further illustrates an image capture module 106 that receives an optical image corresponding to an external object. The image is transmitted along an optical axis through the lens 102 to the image capture module 106. The image capture module 106 may use a variety of formats, such as film (e.g., film stock or still picture film), or electronic image detection technology (e.g., a CCD array, CMOS device or video pickup circuit). The optical axis may be linear, or it may include folds.

Image storage module 108 maintains the captured image in, for example, on-board memory or on film, tape or disk. In one embodiment, the storage medium is removable (e.g., flash memory, film canister, tape cartridge or disk).

Image transfer module 110 provides transferring of the captured image to other devices. For example, the image transfer module 110 may use one or a variety of connections such as, for example, a USB port, IEEE 1394 multimedia connection, Ethernet port, Bluetooth wireless connection, IEEE 802.11 wireless connection, video component connection, or S-Video connection.

The camera 100 may be implemented in a variety of ways, such as a video camera, a cell phone camera, a digital photographic camera, or a film camera.

The liquid cells in the focus and zoom groups could be used to provide stabilization, as described in U.S. patent application Ser. No. 12/327,666 titled "Liquid Optics Image Stabilization," filed Dec. 3, 2008, incorporated by reference in its entirety. By using non-moving lens groups, folds may be used to reduce the overall size as described in U.S. patent application Ser. No. 12/327,651 titled "Liquid Optics with Folds Lens and Imaging Apparatus," filed Dec. 3, 2008, incorporated by reference in its entirety. One or more moving lens groups may be used in combination with one or more liquid cells as described in U.S. patent application Ser. No. 12/246,224 titled "Liquid Optics Zoom Lens and Imaging Apparatus," filed Oct. 6, 2008, incorporated by reference in its entirety.

It is to be noted that various changes and modifications will become apparent to those skilled in the art. Such changes and modifications are to be understood as being included within the scope of the invention as defined by the appended claims.

What is claimed is:

1. A variable power optical system configured to form a final image of an object, the variable power optical system comprising:

an objective lens group on a common optical axis, the objective lens group configured to form an intermediate real image on an image side of the objective lens group, the objective lens group comprising at least one liquid lens cell with at least two liquids with different refractive properties and at least one variable shape contact surface between the two liquids, with variations in the shape of the contact surface producing a change of optical power in the objective lens group and a change in a magnification of the intermediate real image;

an axially stationary positively powered lens group positioned along the common optical axis on an image side of the intermediate real image; and a relay lens group positioned along the common optical axis on an image side of the axially stationary positively powered lens group, the relay lens group comprising at least one liquid lens cell having at least two liquids with different refractive properties and at least one variable shape contact surface between the two liquids, with variations in the shape of the contact surface producing a change of optical power in the relay lens group and a change in a magnification of the final image; and an axially movable lens group positioned along the common optical axis between the relay lens group and the final image, wherein the final image height above the optical axis is larger than the heights of rim rays above the optical axis at the liquid lens cell variable surface in the objective lens group and the relay lens group.

2. The variable power optical system of claim 1, wherein the axially movable lens is the only moving lens group.

3. The variable power optical system of claim 1, further comprising a second relay lens group positioned on an image side of the objective lens group along the common optical axis, the second relay lens group comprising at least one liquid lens cell having at least two liquids with different refractive properties and at least one variable shape contact surface between the two liquids, with variations in the shape of the contact surface producing a change of optical power in the second relay lens group.

4. The variable power optical system of claim 1, wherein the variable power optical system has a zoom ratio between 2.8× and 4.4×.

5. The variable power optical system of claim 1, further comprising a control system that controls the at least one variable shape contact surface of the at least one liquid lens cell in the objective lens group.

6. A camera comprising the variable optical power optical system of claim 1.

7. The variable power optical system of claim 1, wherein an optical stop is located between the object and the intermediate image.

8. The variable power optical system of claim 7, wherein an iris is placed substantially at the stop location to provide a variable aperture.

9. The variable power optical system of claim 1, wherein an optical stop is located between the intermediate image and the final image.

10. The variable power optical system of claim 9, wherein an iris is placed substantially at the stop location to provide a variable aperture.

* * * * *